March 29, 1966 R. L. SEARS ETAL 3,242,823
FAIL SAFE CLAMPING MECHANISM FOR A MACHINE TOOL
Filed March 22, 1965 2 Sheets-Sheet 1
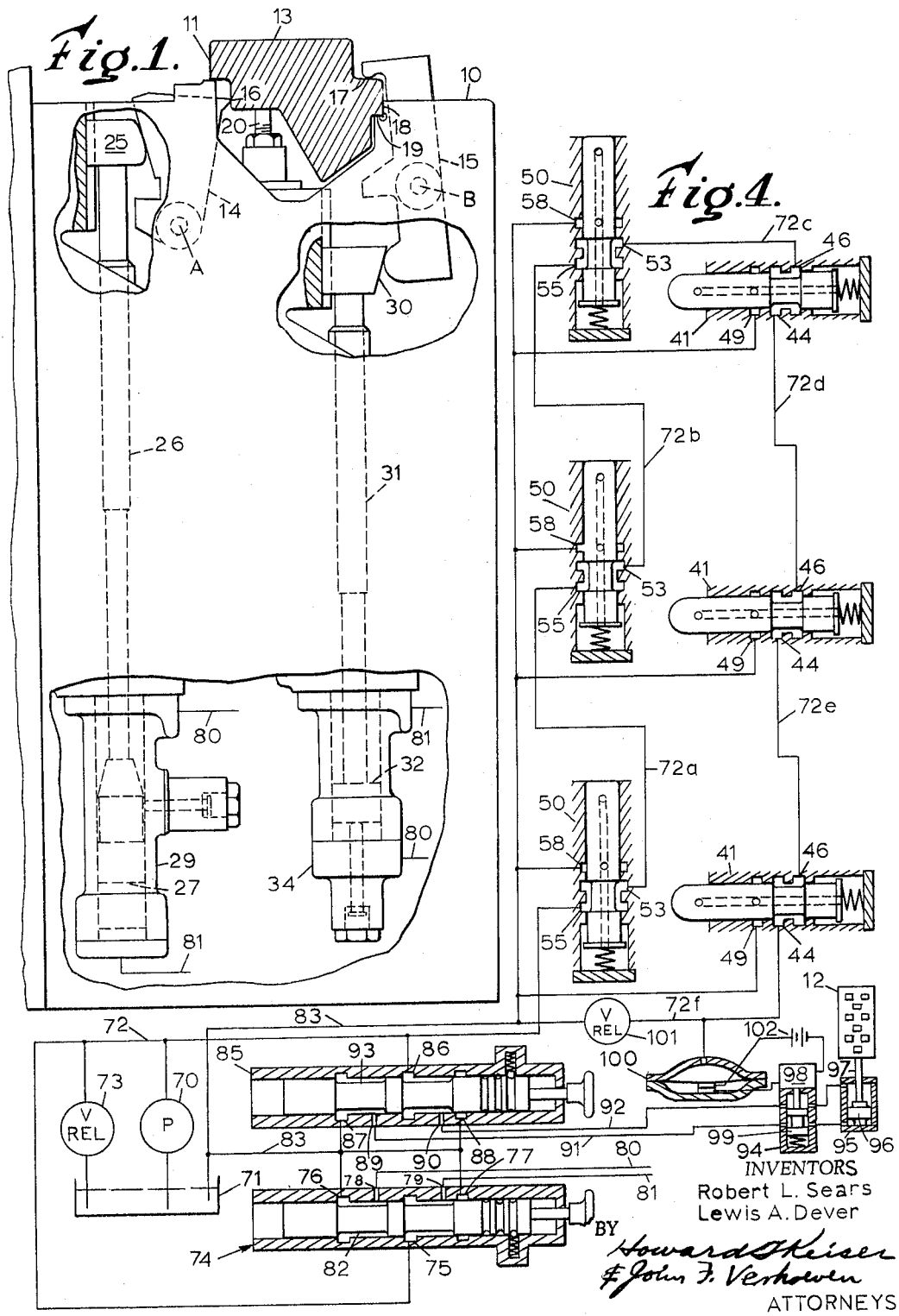
INVENTORS
Robert L. Sears
Lewis A. Dever
BY
Howard Keiser
& John F. Verhoeven
ATTORNEYS March 29, 1966  R. L. SEARS ETAL  3,242,823
FAIL SAFE CLAMPING MECHANISM FOR A MACHINE TOOL
Filed March 22, 1965  2 Sheets-Sheet 2

United States Patent Office  
3,242,823  
Patented Mar. 29, 1966

3,242,823
FAIL SAFE CLAMPING MECHANISM FOR A MACHINE TOOL
Robert L. Sears, Loveland, and Lewis A. Dever, Cincinnati, Ohio, assignors to The Cincinnati Milling Machine Co., Cincinnati, Ohio, a corporation of Ohio
Filed Mar. 22, 1965, Ser. No. 441,784
4 Claims. (Cl. 91—189)

The present invention relates to fail safe clamping mechanism for a machine tool particularly suitable for assuring that workpieces are securely clamped in a broaching machine before broaching operations begin.

It is very important that members, such as workpieces, be securely clamped in a machine tool before an operation is begun. This is particularly true in large machines, such as broaching machines, where the high forces generated can cause severe damage if an operation is begun before all parts are properly clamped.

In the present invention, a simple, effective, fail safe clamping mechanism is provided which will prevent operation of the machine if one part, such as the workpiece, is not properly clamped. In brief, the clamping mechanism has a plurality of clamping actuators, each of which operates a hydraulic valve when the clamp actuator is in the clamp position. All of the hydraulic valves, which can be spaced from the clamps, are connected in series between a fluid pump and a control member which controls the operation of the machine. If one of the clamping actuators is in a release position, the control member renders the machine inoperable.

It is therefore one object of the present invention to provide an improved fail safe clamping mechanism for a machine tool. It is another object of the present invention to provide a clamping mechanism having a plurality of clamps, said mechanism rendering the machine inoperable if any one of the clamp actuators is in the release position. It is yet another object of the present invention to provide a fail safe clamping mechanism in a machine tool, said mechanism having valves spaced from the clamps through all of which operation of the machine is controlled. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3:
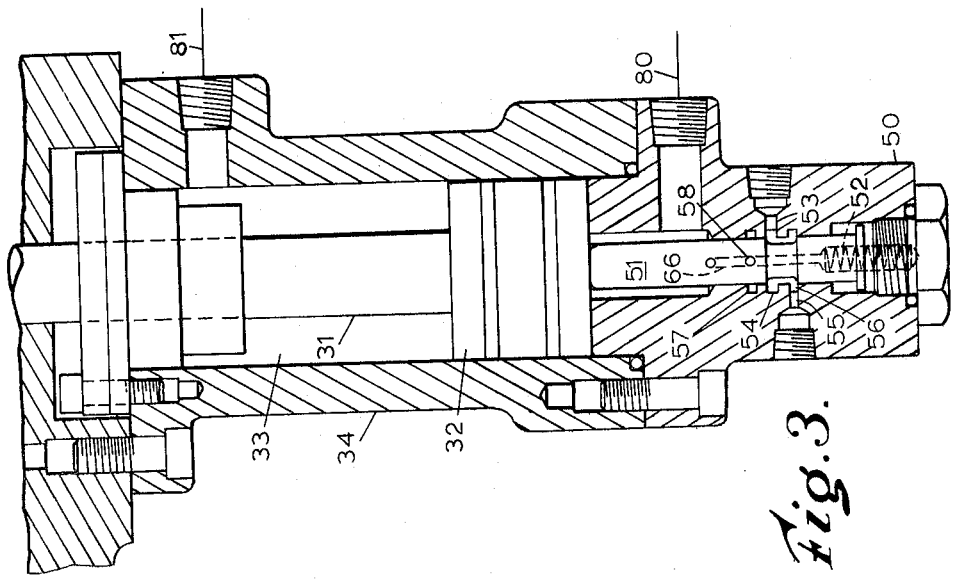
Figure 2:
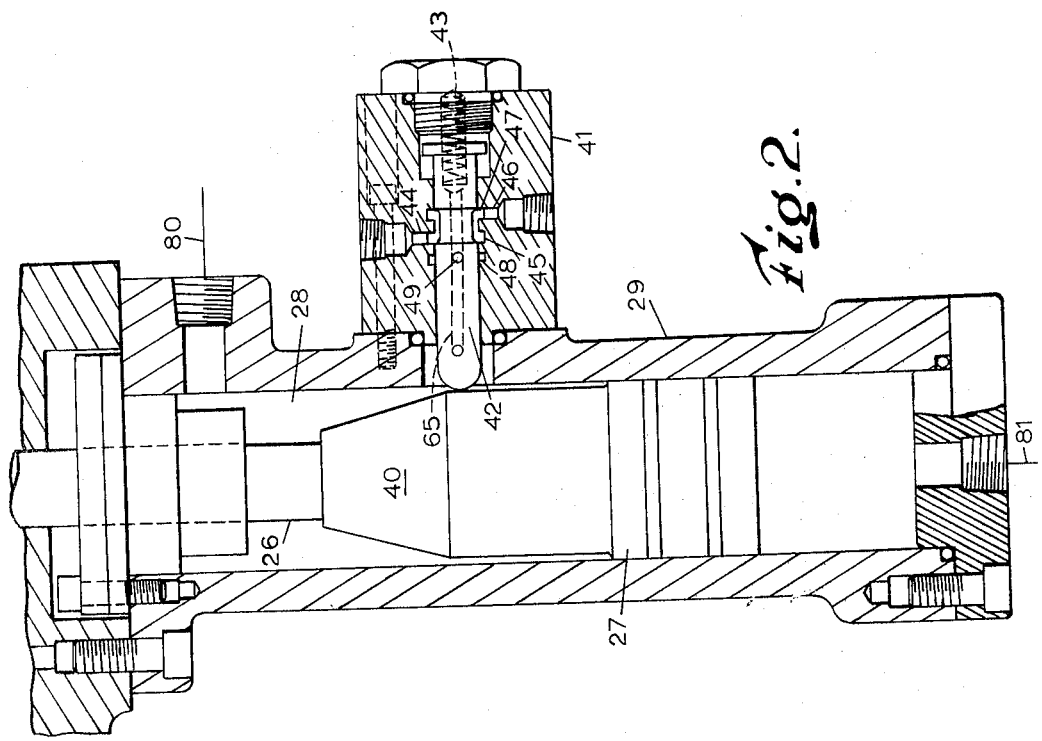

In the drawings:
FIG. 1 is a view, partly broken away for clarity, of two clamps gripping a workpiece in a broaching machine;
FIGS. 2 and 3 are enlarged views of the clamp cylinders, respectively, for the clamps shown in FIG. 1; and
FIG. 4 is a schematic diagram of the hydraulic system of the present invention.

There is shown, in FIG. 1, the bed 10 of a broaching machine. A workpiece 11 is received on the bed for a broaching operation, by broaching tool 12 (see FIG. 4), on the upper surface 13. Two clamps 14 and 15 are mounted on the bed. Clamp 14, which pivots about axis A, has a nose 16 which engages one side of the workpiece; clamp 15, which pivots about axis B, has a nose 17 which engages the other side of the workpiece. Nose 16 urges the workpiece against the vertical shoulder 18 to prevent sideways movement during cutting and nose 17 urges the workpiece down on the horizontal shelf 19 and support 20 to prevent any up and down movement of the workpiece during cutting. Four other clamps (not shown) engage other areas of the workpiece.

Clamp 14 is engaged by cam 25 mounted on clamp rod 26. Clamp rod 26 is connected to piston 27 which is received in chamber 28 of cylinder 29. Clamp 15 is engaged by cam 30 mounted on clamp rod 31. Clamp rod 31 is connected to piston 32 which is received in chamber 33 of cylinder 34.

As shown best in FIG. 2, piston 27 has a conical nose 40. A valve 41 connected to cylinder 29 has a plunger 42 slidably received therein. Plunger 42, which is biased toward cylinder 29 by spring 43, extends through the cylinder wall for engagement by nose 40. As the piston advances (moves upwardly as viewed in FIG. 2), valve member 42 is shifted to the right; as the piston retracts, valve member 42 is shifted to the left. When the valve member 42 is in the extreme right hand position as shown in FIG. 2, port 44, which is in communication with annular groove 45, is connected through the valve to port 46, which is in communication with annular groove 47. As the valve member 42 shifts to the left, port 44 becomes disconnected from port 46 and becomes connected to annular groove 48, which is in continuous communication with a port 49.

As shown best in FIG. 3, a valve 50 is connected to, and forms an end member for, cylinder 34. Valve 50 has a plunger 51 slidably received therein which is biased into engagement with piston 32 by spring 52. As the piston 32 advances (moves upwardly as viewed in FIG. 3), valve member 51 shifts upwardly; as the piston retracts, valve member 51 shifts downwardly. When the valve member 51 is in the extreme lower position as shown in FIG. 3, port 53, which is in communication with annular groove 54, is connected through the valve to port 55, which is in communication with annular groove 56. As the valve member 51 shifts upwardly, port 53 becomes disconnected from port 55 and becomes connected to annular groove 57, which is in continuous communication with a port 58.

The valve members 42 and 51 each have an open passage, 65, 66 respectively, extending therethrough to equalize the pressure at all times on both ends of the valve member. Accordingly, a pressure build up at one end or the other of a valve member will not operate, or hinder the operation of, the valve member. Operation of the valve member occurs only when there is motion of the clamp actuator, which is defined by the cam (25 or 30), the clamp rod (26 or 31), and the piston (27, 40 or 32), and hence when there is motion of the clamp member (14 or 15).

A fluid pump 70 takes fluid from sump 71 and delivers it under pressure to pressure line 72. A relief valve 73, connected to pressure line 72 and discharging to the sump, prevents the creation of excessive pressure in line 72. A reversing valve 74 has a pressure port 75, two exhaust ports 76, 77, and two actuator ports 78, 79. Two actuator lines 80, 81 are connected, respectively, to actuator ports 78, 79. When the shiftable valve member 82 is in the extreme right hand position, pressure port 75 is connected to actuator port 78 (and actuator line 80), and actuator port 79 (and actuator line 81) is connected to exhaust port 77 which is connected to a return line 83. With the valve member to the right, and pressure in actuator line 80, pressure is received above piston 27 and below piston 32, to shift the clamp actuators to the release position. When the shiftable valve member 82 is in the extreme left hand position (as shown in FIG. 4), pressure port 75 is connected to actuator port 79 (and actuator line 81), and actuator port 78 (and actuator line 80) is connected to exhaust port 76 which is connected to return line 83. With the valve member to the left and pressure in actuator line 81, pressure is received under piston 27 and above piston 32 to shift the clamp actuators to the clamp position.

A reversing valve 85 has a pressure port 86, two exhaust ports 87, 88, and two motor ports 89, 90. Two motor lines 91, 92 are connected, respectively, to motor ports 89, 90. When the shiftable valve member 93 is in the extreme right hand position, pressure port 86 is connected to motor port 89 (and motor line 91), and motor port 90 (and motor line 92) are connected to exhaust port 88 which is connected to return line 83. A blocking valve 94 is connected between valve 85 and a broaching tool motor which comprises cylinder 95 and piston 96 slidably received in the cylinder. Piston 96 is connected by rod 97 to broaching tool 12. When the blocking valve solenoid 98 is energized to lower the shiftable valve member 99, and the shiftable valve member 93 of valve 85 is to the right, pressure is received under piston 96 to move the broach tool up (as viewed in FIG. 4). When the shiftable valve member 93 of valve 85 is in the extreme left hand position (as shown in FIG. 4), pressure port 86 is connected to motor 90 (and motor line 92), and motor port 89 (and motor line 91) is connected to exhaust port 87, which is connected to return line 83. If the blocking valve member 99 is down as shown, pressure is received above piston 96 to move the broach tool down (as viewed in FIG. 4).

The valves 41 and the valves 50 are all connected in series between the pump 70 and a pressure switch 100 which defines a control member to operate blocking valve 94. Pressure line 72 is connected to port 55 of one of the valves 50. Line 72a connects port 53 of that valve port 55 of the next valve 50. Line 72b connects port 53 of that valve to port 55 of the next valve 50. Port 53 of that valve is connected by line 72c to port 46 of a valve 41. Port 44 of that valve is connected by line 72d to port 46 of the next valve 41. Port 44 of that valve is connected by line 72e to port 46 of the next valve 41. Port 44 of that valve is connected to line 72f which discharges through relief valve 101 to return line 83.

When all the clamp actuators are in the clamp position to urge the clamps into gripping contact with the workpiece, and the valves 41, 50 are in the positions shown in FIG. 4, pressure is communicated through the valves 41, 50 to the pressure switch 100 to close the switch contacts thereof. When this occurs, solenoid 98 is energized by battery 102 and shiftable blocking valve member 99 is lowered. This permits connection of motor lines 91, 92 to the cylinder 95 to drive the broach tool.

If any one of the clamp actuators is in the release position, one of the valves 41, 50 will be shifted from the position shown in FIG. 4, and the lines 72, 72a, 72b, 72c, 72d, 72e, 72f will be connected through that valve to return line 83, thereby dropping the pressure in pressure switch 100. This separates the switch contacts thereof to deenergize solenoid 98. Deenergization of solenoid 98 raises valve member 99 to block lines 91, 92 from broach motor 95, 96. Thus, if any one of the clamp members is not clamping the workpiece, the tool motor is rendered ineffective.

What is claimed is:
1. In a machine tool,
 (a) a fluid pump,
 (b) a control member,
 (c) a plurality of clamps shiftable between a clamp position and a release position,
 (d) a valve for each clamp, said valves connected in series between the fluid pump and the control member for operation of the control member in response to the condition of the clamps.
2. In a machine tool,
 (a) a fluid pump,
 (b) a control member,
 (c) a plurality of clamping actuators shiftable between a clamp position and a release position,
 (d) a plurality of valves positioned respectively adjacent the clamping actuators, said valves connected in series between the fluid pump and the control member, each valve having a plunger shiftable by the clamp actuator to pass fluid through the valve when the clamp actuator is in one position, said plunger diverting the fluid to discharge when the clamp actuator is in the other position.
3. In a machine tool,
 (a) a fluid pump,
 (b) a control member actuated by the receipt of fluid under pressure,
 (c) a cutting tool operable in response to actuation of said control member,
 (d) a plurality of clamps operable when actuated to secure a workpiece for a cutting operation thereon,
 (e) a plurality of clamp actuators to actuate said clamps, said actuators shiftable between a clamp position and a release position,
 (f) a plurality of valves positioned respectively adjacent the clamping actuators, said valves connected in series between the fluid pump and the control member, each valve having a plunger shiftable by the clamp actuator to divert the fluid to discharge when the clamp actuator is in one position, said plunger passing pressure fluid through the valve when the clamp actuator is in the other position, said pressure fluid passing through all the valves to said control member when all said clamp actuators are in said other position.
4. In a broaching machine,
 (a) a fluid pump,
 (b) a control member actuated by the receipt of fluid under pressure,
 (c) a broaching tool having a motor operable in response to actuation of said control member,
 (d) a plurality of clamps operable when actuated to secure a workpiece for a cutting operation thereon,
 (e) a plurality of clamp actuators to actuate said clamps, said actuators shiftable between a clamp position and a release position,
 (f) a plurality of valves positioned respectively adjacent the clamping actuators, said valves connected in series between the fluid pump and the control member, each valve having a plunger shiftable by the clamp actuator to divert the fluid to discharge when the clamp actuator is in a release position, said plunger passing pressure fluid through the valve when the clamp actuator is in a clamp position, said pressure fluid passing through all the valves to actuate said control member when all said clamp actuators are in the clamp position.

No references cited.

EDGAR W. GEOGHEGAN, *Primary Examiner.*